United States Patent
Nyce et al.

(10) Patent No.: US 6,600,310 B2
(45) Date of Patent: Jul. 29, 2003

(54) LINEAR AND ROTARY MAGNETIC SENSOR

(75) Inventors: David S. Nyce, Apex, NC (US);
Lawrence J. Russell, Apex, NC (US);
Mauro G. Togneri, Cary, NC (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 09/801,318

(22) Filed: Mar. 7, 2001

(65) Prior Publication Data

US 2001/0038281 A1 Nov. 8, 2001

Related U.S. Application Data

(63) Continuation-in-part of application No. 60/187,875, filed on Mar. 8, 2000.

(51) Int. Cl.[7] .................. G01B 7/14; G01B 7/30; F16H 63/00; H01F 7/02; G01D 5/12
(52) U.S. Cl. .................. 324/207.23; 324/207.13; 324/207.24; 324/207.25; 74/473.12; 335/302; 335/306
(58) Field of Search .................. 324/207.13, 207.14, 324/207.2–207.25; 116/28.1; 335/302, 306; 73/313, 314, 290 V, 597; 74/335, 473.12, DIG. 7; 340/456, 686.3; 477/20; 475/158

(56) References Cited

U.S. PATENT DOCUMENTS

| | | | | |
|---|---|---|---|---|
| 3,898,555 A | * | 8/1975 | Tellerman | 324/207.13 |
| 4,107,604 A | * | 8/1978 | Bernier | 324/207.2 |
| 4,471,304 A | * | 9/1984 | Wolf | 324/207.24 |
| 4,654,590 A | * | 3/1987 | Kitaura et al. | 324/207.13 |
| 4,717,874 A | * | 1/1988 | Ichikawa et al. | 324/207.13 X |
| 4,764,767 A | * | 8/1988 | Ichikawa et al. | 324/207.22 X |
| 5,122,750 A | * | 6/1992 | Rippingale et al. | 324/207.22 X |
| 5,197,508 A | * | 3/1993 | Gottling et al. | 137/1 |
| 5,198,763 A | * | 3/1993 | Konishi | 324/207.23 |
| 5,266,917 A | * | 11/1993 | Bleeke et al. | 335/302 X |
| 5,370,015 A | * | 12/1994 | Moscatelli | 324/207.2 X |
| 5,412,317 A | * | 5/1995 | Kyoizumi | 324/207.13 X |
| 5,514,961 A | * | 5/1996 | Stoll et al. | 324/207.13 |
| 5,717,330 A | * | 2/1998 | Moreau et al. | 324/207.13 |
| 6,163,147 A | * | 12/2000 | Peilloud | 324/207.22 |
| 6,211,794 B1 | * | 4/2001 | DeSoto | |

* cited by examiner

*Primary Examiner*—Gerard R. Strecker
(74) *Attorney, Agent, or Firm*—David M. Ostfeld

(57) ABSTRACT

A magnetic-based sensor is disclosed which can detect a linear and rotary position of a shaft whose movement is to be measured. Such sensor can operate to yield linear displacement as well as rotation. A position magnet is mounted on the shaft for measuring linear motion. A spirally wound magnet is mounted on the shaft to detect rotational motion. Both of such motions are detected by a single magnetic-based sensor.

21 Claims, 2 Drawing Sheets

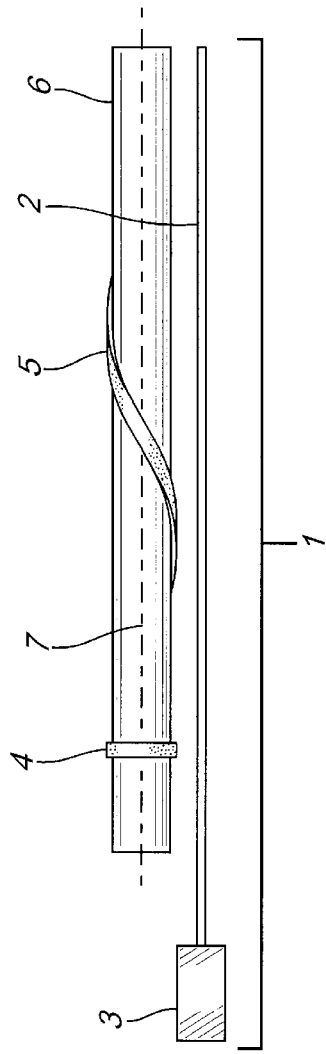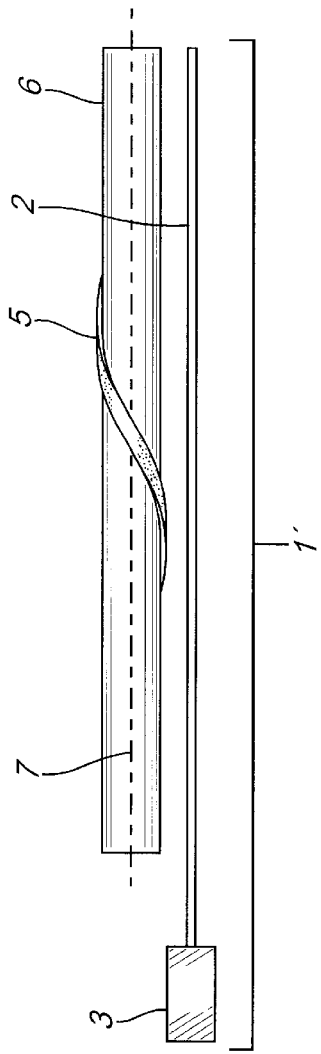

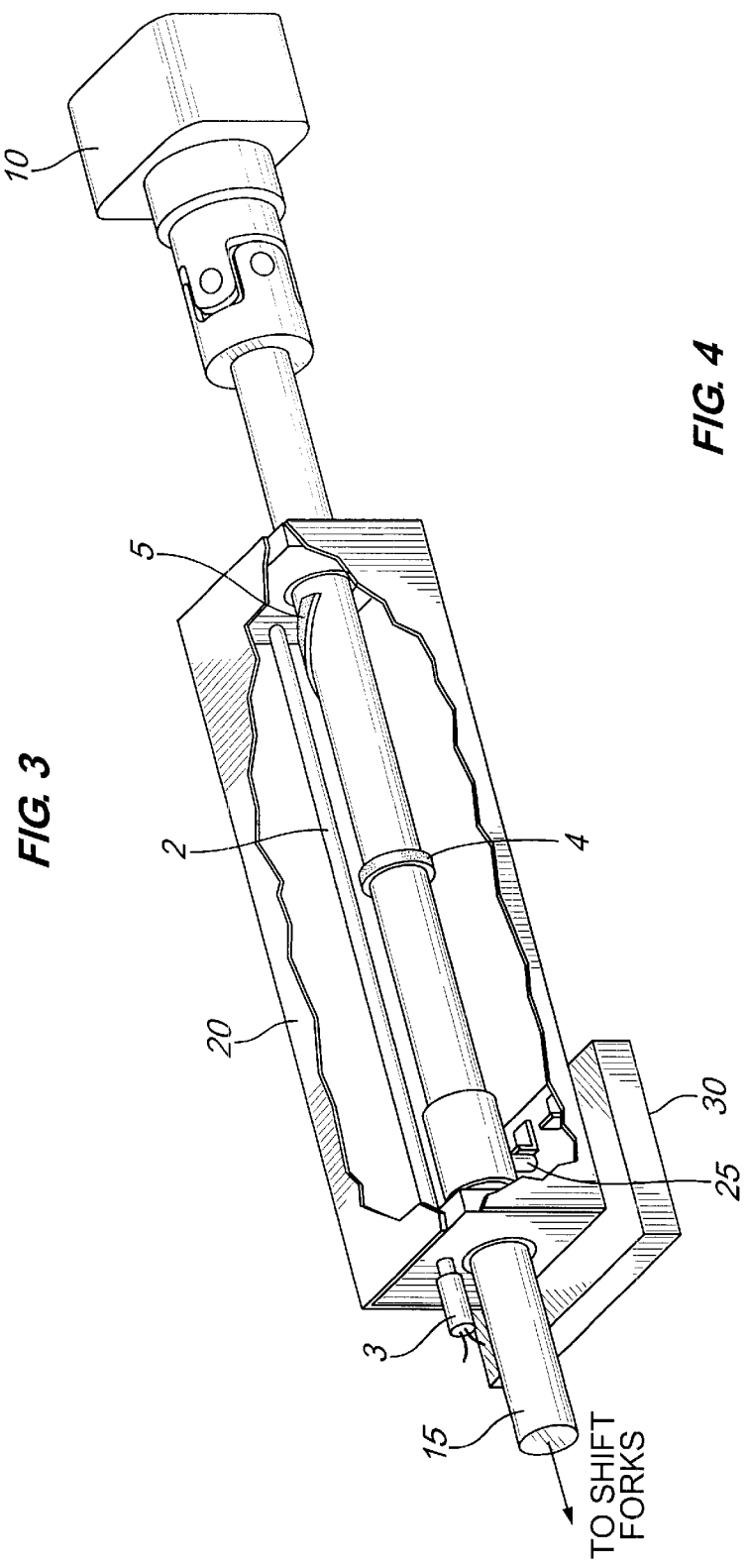
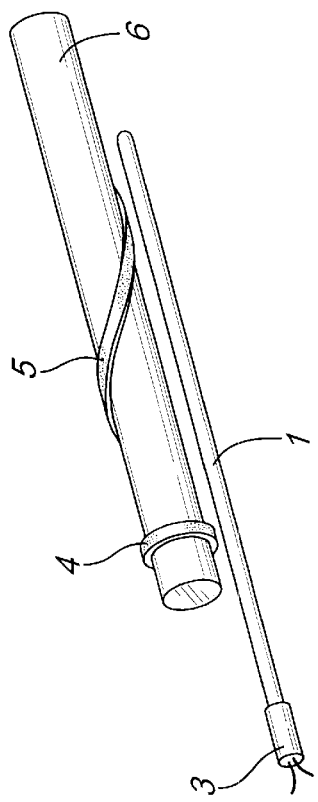
FIG. 3
FIG. 4

LINEAR AND ROTARY MAGNETIC SENSOR

CROSS REFERENCE TO RELATED APPLICATIONS

This application is a continuation-in-part application of, and relies on the priority date of U.S. application Ser. No. 60/187,875, filed Mar. 8, 2000, by David S. Nyce, et al. entitled Linear and Rotary Magnetic Sensor.

BACKGROUND OF THE INVENTION

1. Field of the Invention

The present invention relates to magnet-based sensors and in particular magnet-based sensors required for linear and rotary sensing.

2. Description of the Art

Magnetostrictive transducers having elongated waveguides that carry torsional strain waves induced in the waveguide when current pulses are applied along the waveguide through a magnetic field are well known in the art. A typical linear distance measuring device using a movable magnet that interacts with the waveguide when current pulses are provided along the waveguide is shown in U.S. Pat. No. 3,898,555.

Devices of the prior art of the sort shown in U.S. Pat. No. 3,898,555 also have the sensor element in a housing which also houses the electronics to at least generate the pulse and receive the return signal. The amplitude of the return signal detected from the acoustical strain pulse is, as well known in the art, affected by many parameters. These parameters include the position magnet strength, waveguide quality, temperature, waveguide interrogation current, and assembly tolerances.

Several types of magnetic-based sensors are available for measuring linear or rotary position. Magnetic-based sensors have an advantage in that they provide non-contact sensing; so there are no parts to wear out. Examples of magnetic-based sensors are LVDTs, inductive sleeve sensors, and magnetostrictive sensors.

It is an object of the present invention to combine the functions of a linear position sensor and rotary position sensor into one device.

It is another object of the present invention to provide a cost savings in applications that require both linear and rotary measurements, such as in measuring the gear selection in an automobile transmission.

It is yet another object of the present invention to sense rotary position using a linear position magnetostrictive sensor.

SUMMARY OF THE INVENTION

The present invention relates to a construction of a magnetostrictive linear and rotary position sensor, using at least two magnets. At least one magnet, the position magnet, is moved when measuring a linear motion. A second magnet moves in response to rotational motion about the waveguide or by a device in juxtaposition to the waveguide. This rotational motion can be measured with respect to a fixed position on the sensor, or with respect to the position magnet.

An alternate construction allows measuring rotary position sensing by using a linear position sensor with one or more magnets.

DESCRIPTION OF THE DRAWINGS

For a further understanding of the nature and objects of the present invention, reference should be had to the following figures in which like parts are given like reference numerals and wherein:

FIG. 1 is a schematic view of a linear magnetostrictive position sensor of the present invention;

FIG. 2 is a schematic view of an alternative linear magnetostrictive position sensor of the present invention;

FIG. 3 is a cut-away view of the application of the present invention to a gear shift; and FIG. 4 is a more elaborate schematic of FIG. 1.

DESCRIPTION OF THE PREFERRED EMBODIMENT AND ALTERNATE EMBODIMENT

As shown in FIGS. 1 and 4, the magnetostrictive position sensor 1 of the preferred embodiment of the present invention includes a waveguide 2 connected to a mode converter 3. A transducer sensing element assembly, which may be any transducer, including those of the prior art such as that shown in U.S. Pat. No. 3,898,555, or any other transducer presently on the market or may be introduced in the future, can be used for the combination of the waveguide 2 and the mode converter 3 as shown in FIG. 1 or 2. However, as discussed below, the magnets are adjacent to the waveguide 2, rather than surround it; so it is preferable to use MTS sensors presently on the market which have greater return signal magnitude with less noise.

Position sensor 1 may be used for measuring displacements. The type of transducer that may be used for the present invention should not be considered to be limited by the disclosure of its application. Further, except for the mechanical construction indicating a preferred mechanical mounting of the waveguide and using a displacement sensor, the general type of transducer should not be deemed to be limited by the disclosure of the waveguide and should not be deemed to limit a mode converter used with the waveguide. Further, the transducer should not be deemed to be limited to any particular type of electronics used with the waveguide. Additionally, the general type and nature of a transducer in electrically producing the return pulse and interfacing through the return pulse with any electronics of a buyer or user of the device should not be deemed to be limited by the disclosure.

The waveguide 2 of the sensor or transducer 1 is mounted juxtaposed to the element 6 to be measured. The element 6 to be measured has the possibility of rotary motion about the measurement axis 7 as well as linear motion. In addition, a spiral magnet 5 and a position magnet 4 are mounted on the element 6 to be measured for FIG. 1. Typically, the position magnet 4 is doughnut-shaped.

As shown in FIG. 2, the alternative embodiment of the sensor 1' includes a waveguide 2 and a mode converter 3 connected together, and juxtaposed to the element 6 to be measured. Again, the element 6 to be measured has the possibility of rotary motion around measurement axis 7 as well as linear motion. A spiral magnet 5, but no doughnut-shaped position magnet 4, is mounted on the element 6 to be measured.

In FIG. 1, the linear magnetostrictive position sensor 1 measures the distance from the mode converter 3 to position magnet 4 and from the mode converter 3 to the point on spiral magnet 5 which is closest to the waveguide 2. When the element 6 to be measured moves linearly along measurement axis 7, the distance between the point on waveguide 2 adjacent to position magnet 4 and the mode converter 3 changes. The linear magnetostrictive position sensor 1 measures this change in distance in a manner well known in the art and thus indicates the new position of the element to be measured 6.

When the element to be measured 6 rotates about measurement axis 7, the distance between the point on waveguide 2 adjacent to position magnet 4 and the point on waveguide 2 adjacent to the closest point on spiral magnet 5 changes. The linear magnetostrictive position sensor 1 measures the distance to each of these points in a manner well known in the art and may subtract the readings to produce an output which is proportional to the amount of rotation of element 6 to be measured. Alternatively, the distance between position magnet 4 and spiral magnet 5 may be directly measured as the time between detection of their respective ultrasonic strain pulses at mode converter 3. All of the measurements are achievable by devices known in the art.

Position magnet 4 is normally doughnut-shaped, and can be of standard construction as used in commercially available magnetostrictive sensors. Alternatively, cylinder, cube, or other shapes of position magnet can be used when mechanically feasible and constructed to produce sufficient magnetic field strength within the waveguide 2 to produce a strain wave which is detectable at the mode converter 3. The same configuration can be used to measure only rotational position when the element 6 to be measured does not have any linear motion along measurement axis 7.

In FIG. 2, the linear magnetostrictive position sensor 1 measures the distance from the mode converter 3 to the point on spiral magnet 5 which is closest to the waveguide 2. When the element 6 to be measured rotates about measurement axis 7, the distance between the point on waveguide 2 adjacent to the closest point on spiral magnet 5 changes. The linear magnetostrictive position sensor 1 measures the distance to this point and produces an output which is proportional to the amount of rotation of element 6 to be measured.

In both cases when measuring the rotational position, spiral magnet 5 can be replaced with another configuration of magnet which provides a varying magnetic field position with rotational input. This can be accomplished by several methods including but not limited to: using an angled bar magnet; using a magnet molded as part of, or attached to, the element 6 being measured, using more than one magnetic element attached to the element 6 being measured and arranged to provide a varying magnetic field position with rotational output.

FIG. 3 illustrates a gear system equipped with the sensor of FIG. 1. The gear system includes a rotary and linear motor 10 connected to a shifter shaft 15, which is connected to shift forks (not shown). Shifter shaft 15 rests in a housing 20 and is connected by shift pin 25 to shift pin guide 30. Accordingly, measuring distance from mode converter 3 indicates the gear setting by measuring rotation in conjunction with linear distance movement of shift shaft 15. Housing 20 also surrounds waveguide and return 2, keeping it juxtaposed with ring magnet 4 and spiral magnet 5. Magnets 4, 5 interact with waveguide 2 and waveguide 2 interacts with mode converter 3 in the manner set out above to indicate linear displacement of shifter shaft 15 and rotation of shifter shaft 15 in response to linear and rotary motor 10.

The present rotary/linear sensor invention can be also applied in other areas, such as a feedback element on rotary/linear motors, including the Model DSL rotary/linear pneumatic actuator manufactured and marketed by Festo.

Because many varying and different embodiments may be made within the scope of the invention concept taught herein which may involve many modifications in the embodiments herein detailed in accordance with the descriptive requirements of the law, it is to be understood that the details herein are to be interpreted as illustrative and not in a limiting sense.

What is claimed as invention is:

1. A sensor for detecting linear and rotary motion of a workpiece, comprising:
    a first magnet mounted on the workpiece;
    a sensor using said first magnet for detecting rotary motion of the workpiece;
    said first magnet being spirally mounted on at least a portion of the workpiece and juxtaposed to at least a portion of said sensor;
    wherein there is a second magnet mounted on the workpiece, said sensor using said second magnet for detecting linear motion of the workpiece;
    said second magnet being mounted to circumscribe at least a portion of the workpiece and juxtaposed to at least a portion of said sensor.

2. The sensor of claim 1, wherein said sensor is mounted substantially parallel to at least a portion of the workpiece where said first magnet and such second magnet are mounted.

3. The sensor of claim 2, wherein said sensor is juxtaposed to at least a portion of the workpiece to which it is substantially parallel.

4. A sensor for detecting linear and rotary motion of a workpiece, comprising:
    a first magnet mounted on the workpiece;
    a sensor using said first magnet for detecting rotary motion of the workpiece, at least a portion of said sensor mounted substantially parallel to the rotation axis of the workpiece; and
    said first magnet being spirally mounted on at least a portion of the workpiece and juxtaposed to at least a portion of said sensor;
    wherein there is a second magnet mounted on the workpiece, said sensor using said second magnet for detecting linear motion of the workpiece;
    said second magnet being mounted to circumscribe the circumference on at least a portion of the workpiece and juxtaposed to at least a portion of said sensor;
    wherein said sensor is mounted substantially parallel to at least a portion of the workpiece where said first magnet and such second magnet are mounted;
    wherein said sensor is juxtaposed to at least the portion of the workpiece to which it is substantially parallel;
    wherein said sensor is a magnetostrictive sensor.

5. The sensor of claim 4, wherein said magnetostrictive sensor includes a waveguide and a mode converter, at least the portion of the workpiece on which said first magnet is mounted being juxtaposed to at least a portion of said waveguide.

6. The sensor of claim 5, wherein said second magnet is a position magnet for detecting linear motion.

7. The sensor of claim 6, wherein said second magnet is substantially doughnut-shaped.

8. The sensor of claim 7, wherein at least the portion of the workpiece on which said second magnet is mounted is juxtaposed to at least a portion of said waveguide.

9. A gear system sensor to detect gear position, the gear system including a rotary and linear motor connected to, and linear displacing and rotating, a shifter shaft which engages the appropriate gears, comprising:

a first magnet mounted on the shifter shaft;

a sensor using said first magnet for detecting rotary motion of the shifter shaft to determine the gear selected through the use of said first magnet on the shifter shaft, at least a portion of said sensor mounted juxtaposed to the shifter shaft on which said first magnet is mounted; and said first magnet being spirally mounted on at least a portion of the portion of the shifter shaft juxtaposed to said magnet based sensor.

10. The sensor of claim 9, wherein there is further included a second magnet, said sensor detecting linear motion through the use of said second magnet; said second magnet being mounted on at least a portion of the shifter shaft and juxtaposed to at least a portion of said sensor responsive to said second magnet.

11. The system of claim 10, wherein said sensor is a magnetostrictive sensor having a waveguide and a mode converter, the portion of the shifter shaft having said first magnet mounted thereon being juxtaposed to at least a portion of said waveguide.

12. The system of claim 11, wherein the portion of the shifter shaft having said first magnet mounted thereon also has said second magnet mounted thereon.

13. A sensor for detecting linear and rotary motion of a workpiece, comprising:

a first magnet mounted on the workpiece;

means for detecting rotary motion responsive to said first magnet, at least a portion of said means mounted substantially parallel to the rotation axis of the workpiece for the length of said first magnet; and said first magnet being spirally mounted on at least a portion of the workpiece and juxtaposed to at least a portion of said means responsive to said first magnet.

14. The sensor of claim 13, wherein there is a second magnet mounted on the workpiece, said means for detecting linear motion responsive to said second magnet; said second magnet being mounted on at least a portion of the workpiece and juxtaposed to at least a portion of said means responsive to said second magnet.

15. The sensor of claim 14, wherein said means is mounted substantially parallel to at least a portion of the workpiece where said first magnet and such second magnet are mounted.

16. The sensor of claim 15, wherein said means is juxtaposed to at least the portion of the workpiece to which it is substantially parallel.

17. Thee sensor of claim 16, wherein said means is a magnetostrictive sensor for nonmagenetic field strength detection.

18. The sensor of claim 1, wherein a plane substantially passing through said second magnet would be intersected at a point by a line passing through the axis of rotation of the workpiece.

19. The sensor of claim 1, wherein at least a portion of the longitudinal axis of said sensor is mounted substantially parallel to the rotation axis of the workpiece along substantially the full length of said first magnet.

20. The sensor of claim 1, wherein said second magnet is an annular magnet.

21. A process for determining the linear and rotary displacement of a workpiece using a first magnet, the first magnet spirally mounted on the workpiece and a second annular magnet about at least a portion of the workpiece, comprising the steps of:

sensing the rotational location of the first magnet by the sensor;

sensing the linear location of the second magnet by the sensor;

determining the linear position of the workpiece from the second magnet;

determining the rotational position of the workpiece as the difference between the linear position of the workpiece and the position of the first magnet.

* * * * *